UNITED STATES PATENT OFFICE.

PAUL MIGUET, OF ST. JULIEN-MONTRICHER, FRANCE, ASSIGNOR TO SOCIETE DITE: ROCHETTE FRÈRES, OF ST. JULIEN-MONTRICHER, SAVOIE, FRANCE.

PROCESS FOR THE PREPARATION OF PURE ALKALINE ALUMINATES.

1,376,563. Specification of Letters Patent. Patented May 3, 1921.

No Drawing. Application filed November 3, 1919. Serial No. 335,418.

*To all whom it may concern:*

Be it known that I, PAUL MIGUET, a citizen of the French Republic, and resident of St. Julien-Montricher, Savoie, France, have invented certain new and useful Improvements in Processes for the Preparation of Pure Alkaline Aluminates, of which the following is a specification.

This invention consists in a process for the preparation of alkali aluminates, $Al_2O_3$ $Na_2O$, for example, free from acid oxids such as $SiO_2$ and rendering it possible to obtain advantageously in consequence pure alumina or salts of aluminium.

It is known that on heating a suitable mixture of lime and bauxite or any other aluminium ore to a temperature sufficiently high there may be obtained an aluminate of lime which is capable of producing alkali aluminates by double decomposition with a hot liquid solution of the corresponding alkali carbonates.

But the acid oxids which always accompany the alumina are equally capable of entering into combination with the lime and the alkalis, so that with the heat treatment pure and simple of the mixture of lime and ore such as practised heretofore the immediate product of the double composition is only an impure alkali aluminate contaminated in particular with alkali silicate.

The chief objection to such an aluminate resides in the circumstance that pure alumina or salts of aluminium can only be extracted after the foreign acid oxids have been eliminated at considerable expense; such as is experienced particularly if it is desired to precipitate alumina with $CO_2$ which is a reagent of much commercial importance in that it reproduces the alkali carbonate necessary for the following operation.

Indeed, whether the operation is effected in the cold or whether the operation is effected with heat, a large proportion of silica for example is precipitated with the alumina; in the first case because the gelatinous alumina obtained is only filtered with difficulty; in the second case because besides the alumina is obtained in the crystalline state there is formed insoluble silico carbonate of soda.

It is therefore necessary to obtain alkali aluminates free from impurities and the best means of arriving at the result economically is to free the aluminate of lime (which is to be used for effecting the double decomposition with alkali carbonate) from all the foreign oxids contained in the lime and the aluminium ores treated.

The present invention accordingly has for its object the reduction of all of the oxids other than alumina, in the clay or other aluminous ores treated, such oxids other than alumina being referred to as "foreign oxids." This can readily be accomplished by heating, in an electric furnace, the mixture containing (*a*) an alkaline earth (*e. g.* lime) or a compound of an alkaline earth metal which on heating is converted into the oxid (*e. g.* calcium carbonate), (*b*) an aluminous ore (*e. g.* clay) and (*c*) a reducing agent (*e. g.* carbon, carbid of aluminum, calcium or silicon).

From this treatment by fusion and partial reduction there results not only aluminate of lime but also ferrous alloy which is of importance in the metallurgy of iron in that it contains, besides iron, silicon and titanium contained in the mixture treated, an appreciable percentage of aluminium produced by the commencement of the reduction of $Al_2O_3$ indispensable for the complete elimination of the undesirable oxids.

As the ferrous alloy obtained as a by-product is sufficiently dense to collect at the bottom of the furnaces or of the ingot molds, the aluminate of lime floats on the top practically free from foreign oxids and also free from metals or alloys derivable therefrom and is thus capable of producing pure alkali aluminates when double decomposition with the corresponding carbonates is effected.

The invention is thus capable of solving the problem of economically preparing alkali aluminates free from foreign acid oxids such as $SiO_2$, the more so in that it permits the complete utilization of the aluminium ores by converting all the oxids except alumina (and a little of this latter), into the state of alloys suitable for use in the metallurgy of iron.

Besides this advantage there is also obtained the economical and technical advantage due to the fact that the precipitate of calcium carbonate obtained later in the process is free from foreign oxids, and compounds thereof, and this may be utilized for heating, with more bauxite, or other ore, adding small amounts of other lime, to make up for the losses in handling.

The economy is self evident. As to the technical aspect of the matter it is understood that, by reason of this economy, there may be substituted partially or wholly for the lime, any other oxid of an alkaline earth, baryta for example, rendering possible the production of the aluminate of an alkaline earth metal, whether simple or complex, which is more readily adapted for double decomposition with alkali carbonates, than is calcium aluminate.

I claim:

1. A process for the preparation of pure alkali aluminate, by double decomposition of alkali carbonate with an alkaline earth metal aluminate practically free from oxids other than alumina.

2. In the production of alkali aluminate, the improvement which comprises reaction with an alkaline earth compound which upon heating alone leaves an oxid, on aluminum oxid ore in the presence of a reducing agent at a temperature sufficiently high to reduce substantially all of the oxids in the ore, other than the $Al_2O_3$, separating the reduced material from the alkaline earth aluminate and reacting on the latter with an alkali metal carbonate.

In testimony whereof I have signed my name to this specification in the presence of a subscribing witness.

PAUL MIGUET.

Witness:
  CHAS. P. PRESSLY.